US00RE36499E

United States Patent [19]

Feucht

[11] E Patent Number: Re. 36,499

[45] Reissued Date of Patent: Jan. 18, 2000

[54] METHOD AND APPARATUS FOR HOLDING A CYLINDER VALVE CLOSED DURING COMBUSTION

[75] Inventor: Dennis D. Feucht, Morton, Ill.

[73] Assignee: Caterpillar Inc., Peoria, Ill.

[21] Appl. No.: 09/099,892

[22] Filed: Jun. 18, 1998

Related U.S. Patent Documents

Reissue of:

[64] Patent No.: 5,615,646
Issued: Apr. 1, 1997
Appl. No.: 08/635,799
Filed: Apr. 22, 1996

[51] Int. Cl.[7] ..... F01L 9/02; F01L 1/30

[52] U.S. Cl. ..... 123/90.12; 123/90.24; 123/90.25; 123/188.8

[58] Field of Search ..... 123/90.11, 90.12, 123/90.13, 90.24, 90.25, 903.9, 188.8

[56] References Cited

U.S. PATENT DOCUMENTS

| | | | |
|---|---|---|---|
| 1,049,123 | 12/1912 | Mercer | 123/188.8 |
| 1,129,393 | 2/1915 | Huff | 123/76 |
| 1,405,597 | 2/1922 | Kirby | 123/90.47 |
| 1,491,023 | 4/1924 | Belden | 123/90.27 |
| 1,539,227 | 5/1925 | Wood | 123/65 VB |
| 2,954,017 | 9/1960 | Forstner | 123/90.16 |
| 3,168,083 | 2/1965 | Buchanan | 123/90.24 |
| 3,463,131 | 8/1969 | Dolby | 123/90.25 |
| 3,518,976 | 7/1970 | Thuesen | 123/90.16 |
| 3,926,159 | 12/1975 | Michelson et al. | 123/90.11 |
| 3,978,826 | 9/1976 | Gavrun | 123/90.24 |
| 4,364,341 | 12/1982 | Holtmann | 123/90.17 |
| 4,593,658 | 6/1986 | Moloney | 123/90.12 |
| 4,602,597 | 7/1986 | Rhoads | 123/90.15 |
| 4,723,515 | 2/1988 | Burandt | 123/90.16 |
| 4,977,869 | 12/1990 | Fayard | 123/188.8 |
| 5,522,358 | 6/1996 | Clarke | 123/188.8 |

FOREIGN PATENT DOCUMENTS

| | | |
|---|---|---|
| 2467971 | 5/1981 | France . |
| 4232573 | 4/1993 | Germany . |
| 4333493 | 4/1995 | Germany . |
| 59-206606 | 11/1984 | Japan . |
| 94/18437 | 8/1994 | WIPO . |

*Primary Examiner*—Weilun Lo
*Attorney, Agent, or Firm*—Michael McNeil; Eric M. Bram

[57] ABSTRACT

An outwardly opening valve system for an engine includes an engine having a hollow piston cylinder in fluid communication with a gas passageway via an opening. The engine also has a piston bore that opens to the hollow piston cylinder. A portion of the opening includes an outward valve seat positioned adjacent the gas passageway. An outward valve member with a valve face is positioned substantially in the gas passageway. The valve member is moveable between a closed position in which the valve face is against the valve seat closing the opening and an open position in which the valve face is away from the valve seat. An intensifier piston is positioned to reciprocate in the piston bore and has one end contacting gas within the hollow piston cylinder. Finally, a coupling linkage interconnects the intensifier piston to the outward valve member so that the valve member is held closed during combustion by exploiting combustion pressure within the hollow piston cylinder.

19 Claims, 2 Drawing Sheets

METHOD AND APPARATUS FOR HOLDING A CYLINDER VALVE CLOSED DURING COMBUSTION

Matter enclosed in heavy brackets [ ] appears in the original patent but forms no part of this reissue specification; matter printed in italics indicates the additions made by reissue.

TECHNICAL FIELD

The present invention relates generally to outward opening valves for internal combustion engines, and more particularly to a method and apparatus for holding outwardly opening cylinder valves for an engine closed during combustion.

BACKGROUND ART

In the past, almost all engines utilized inwardly opening valves to permit the exchange of gases with the engine's hollow piston cylinders between each combustion event. The valve member typically includes an enlarged portion with an annular valve face that is positioned within the hollow piston cylinder and a stem attached to the enlarged portion that protrudes away through the opening connecting the cylinder to a gas passageway. During combustion, these valve members are held against their seats by the high pressure differential existing across the valve opening during combustion. In most cases, these types of valves are pushed open between combustion events by a cam that is driven directly by the engine. While these types of cam driven inwardly opening valves have performed well over many years, the current trend toward electronically controlled valves may render the inwardly opening valves of the prior art unsuitable.

In the case of diesel engines, the timing of valve opening with the movement of the piston in its cylinder is critical because the piston and valve members must necessarily occupy the same space within the hollow piston cylinder, only at different times.

Although valve to piston contact is a possibility with prior art cam driven systems, it rarely occurs because the mechanical interconnection of the various components makes such contact extremely unlikely. In the case of electronically controlled and actuated valve members, piston contact is much more likely because there is no mechanical interconnection. In other words, potentially catastrophic valve to piston contact can occur simply because of an erroneous open command produced by the engine computer due to software errors and/or erroneous sensor inputs to the computer. Thus, the real and perceived danger of valve to piston contact with electronically actuated and controlled valves has hindered movement in the industry to a camless engine that is completely electronically actuated and controlled.

One method of avoiding the possibility of valve to piston contact is to utilize outwardly opening valves that are actually positioned outside the hollow piston cylinder and therefore do not have the possibility of valve to piston contact. However, outwardly opening valves have never been successfully implemented into diesel engines on a large scale because of the great difficulty in holding such valve members closed during the high pressures produced by combustion. In those cases where outwardly opening valves have been successfully utilized, the actuation system utilized to both hold the valve closed and open the valve at desired times often requires large amounts of energy, which again renders such a system less than desirable.

The present invention is directed to overcoming the problems of holding outwardly opening valves closed during combustion so that the current trend toward an electronically controlled and actuated valve system can continue.

DISCLOSURE OF THE INVENTION

In one embodiment, an outwardly opening valve system for an engine includes an engine having a hollow piston cylinder in fluid communication with a gas passageway via an opening. The opening includes an outward valve seat adjacent the gas passageway. The engine block also includes a piston bore that opens to the hollow piston cylinder. An outward valve member with a valve face is positioned in the gas passageway. The valve member is moveable between a closed position in which its valve face is against the valve seat closing the opening and an open position in which the valve face is away from the valve seat. An intensifier piston is positioned to reciprocate in the piston bore with one end contacting gas within the hollow piston cylinder. A coupling linkage interconnects the intensifier piston with the outward valve member.

In the method of the present invention, the intensifier piston is coupled to the outward valve member such that a force on the intensifier piston from combustion pressure within the hollow piston cylinder is transformed into a force on the outward valve member that is opposite in direction and greater in magnitude to a force on the outward valve member from the combustion pressure within the hollow piston cylinder. In other words, the coupling of the intensifier piston to the outward valve member allows the combustion pressure within the hollow piston cylinder to be exploited to hold the valve member closed during combustion to obtain the same advantage as the inwardly opening valve members of the prior art but without the risk of valve to piston contact that exists in prior art systems.

One object of the present invention is to eliminate the possibility of valve to piston contact during the operation of an engine.

Another object of the present invention is to exploit combustion pressure to hold an outwardly opening valve closed during combustion.

Still another object of the present invention is to support one possible avenue of technology toward the goal of a camless engine.

BEST MODE FOR CARRYING OUT THE INVENTION

Figure 1:
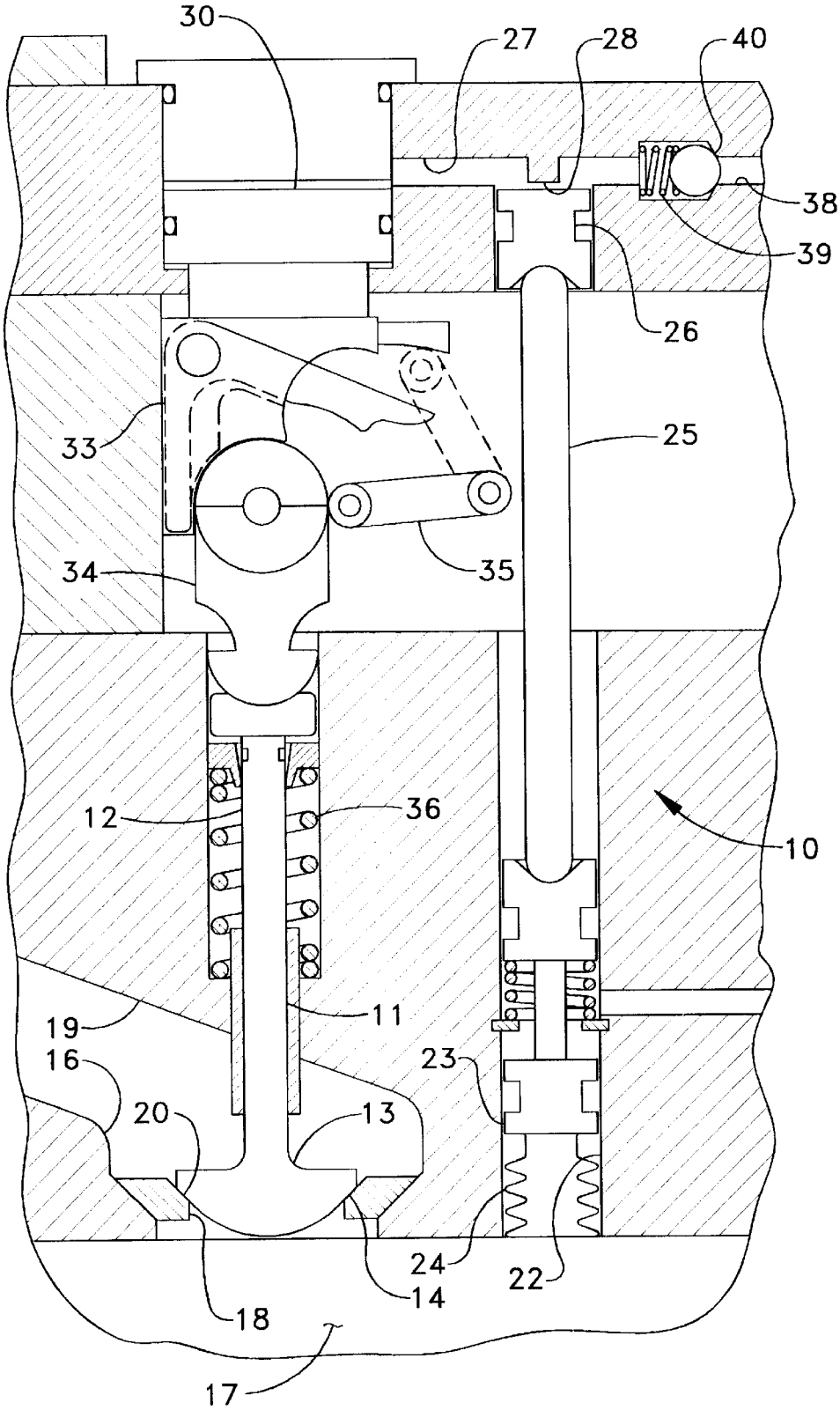
FIG. 1 is a partial sectioned side elevational view of an engine having an outwardly opening valve system according to the present invention.

Referring now to FIG. 1, an engine 16 includes a gas passageway 19 that opens into a hollow piston cylinder 17 via an opening 18. A portion of opening 18 is machined to include an annularly shaped outward valve seat 20 that is positioned adjacent gas passageway 19. An outwardly opening valve system 10 is mounted to engine 16 above hollow piston cylinder 17. The system includes an outward valve member 11 having a stem 12 and an enlarged portion 13 that is positioned substantially within gas passageway 19.

Enlarged portion 13 is machined to include an annular valve face 14 which serves to close opening 18 when seated against valve seat 20. Gas passageway 19 is open to hollow piston cylinder 17 when outward valve member 11 is lifted off its seat under the action of compression spring 36.

The engine also includes a piston bore 22 that opens to hollow piston cylinder 17. An intensifier piston 23 is positioned to reciprocate within piston bore 22. A portion of intensifier piston 23 is an insulator 24 that protects the intensifier piston from damage due to the high temperatures produced during combustion. Intensifier piston 23 is connected to a hydraulic plunger 26 via a push rod 25. One face of hydraulic plunger 26 is exposed to hydraulic fluid pressure within cavity 27. A back stop 28 limits the range of movement of both hydraulic plunger 26 and intensifier piston 23. The bottom face of insulator 24 is preferably arranged so that it is about flush with the inner surface of hollow piston cylinder 17 during combustion in order to avoid altering the performance of the combustion which might otherwise occur if insulator 24 protruded into hollow piston cylinder 17 or if piston bore 22 added any significant volume to the combustion chamber.

Between combustion events, an actuator 35 triggers a latch mechanism 33 which allows an over center device 34 to move off center. When activated, actuator 35 permits valve 11 to lift off its seat under the action of compression spring 36 because over center device 34 is moved to the side in a manner known in the art. Any suitable actuation device could be substituted in the place of items 33–35 provided the device can be placed in a locked position when the valve is closed. Those skilled in the art will appreciate that other actuators could be used such as solenoids, dc motors or even electronically controlled hydraulics. Those skilled in the art will also appreciate that any suitable over center cam mechanism could also be substituted for the latch 33 in over center device 34 which is illustrated.

During the combustion, the over center mechanism 34 and latch mechanism 33 function essentially as a rigid push rod acted upon from above by a hydraulic plunger 30. Plunger 30 is exposed to fluid pressure within cavity 27. During combustion, the pressure force acting on intensifier piston 23 is transferred to increase pressure within cavity 27 via hydraulic plunger 26. Hydraulic plunger 30 is in turn sized so that the downward pressure force acting on outward valve member 11 via latch 33 and over center device 34 is greater than, and in an opposite direction from, the upward force tending to open valve member 11 from the pressure acting on enlarged portion 13 from within hollow piston cylinder 17. Thus, the coupling linkage extending between intensifier piston 23 and outward valve member 11 is sized and arranged in such a way that the combustion pressure within hollow piston cylinder 17 is used to hold outward valve member 11 against its seat during combustion so that no leakage around the valve occurs. The term "coupled" is intended to mean that one member moves as a function of the distance moved by the other member due to a physical linkage existing between the two members. The function is preferably linear so that the relative movement is in a constant proportion. In the present case this is accomplished by providing a substantially incompressible hydraulic fluid, such as lubricating oil, as the hydraulic medium. Between combustion events, any loss due to leakage or other causes is made up by hydraulic fluid entering cavity 27 through a re-supply passage 38. A check valve 40, which is biased closed via a spring 39, prevents the back flow of hydraulic fluid from cavity 27 into the re-supply passage 38.

Because the present invention can utilize outwardly opening valve members yet still provide adequate closure during combustion, there is no chance for piston to valve contact to occur. Furthermore, in some instances, an additional advantage can be realized because less power is required to operate the valve and mechanism since residual pressure in the hollow piston cylinder following a normal expansion cycle can sometimes be exploited to open the valve. In most cases, the preferred hydraulic medium would be lubricating oil since the engine already circulates pressurized oil to other engine components it provides a ready source of relatively incompressible fluid to serve as a hydraulic medium. Thus, the present invention can be incorporated into an existing engine system without the need to provide a completely new and additional hydraulic system.

Figure 2:
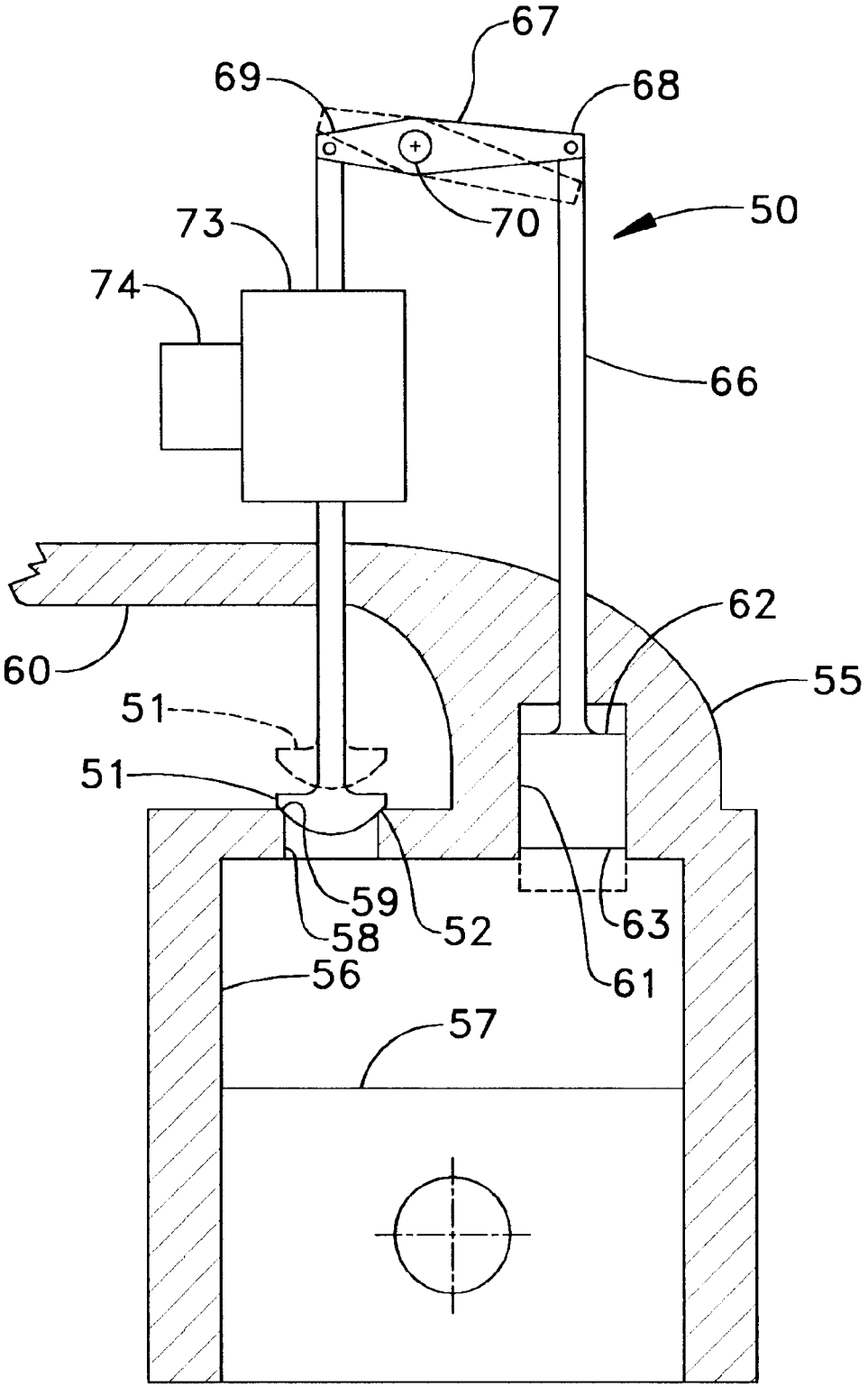
FIG. 2 is a partial sectioned side elevational view of an outwardly opening valve system according to another aspect of the present invention.

Referring now to FIG. 2, a mechanical coupling linkage version of the present invention is illustrated as an alternative to the hydraulic coupling linkage of FIG. 1. Referring now to FIG. 2, an engine 55 includes a hollow piston cylinder 56 that opens to a gas passageway 60 via an opening 58. A portion of opening 58 is machined to include an annular valve seat 59 that is positioned adjacent gas passageway 60. A piston 57 reciprocates within hollow piston cylinder 56 in a manner well known in the art.

As in the previous embodiment, engine 55 includes a piston bore 61 that opens into hollow piston cylinder 56. An outwardly opening valve system 50 is mounted to engine 55 above hollow piston cylinder 56. The system includes an outward valve member 51 having a valve face 52 machined on one end. Gas passageway 60 is closed to hollow piston cylinder 56 when valve face 52 is against valve seat 59.

Between combustion events, an over center device 73 of a type known in the art is utilized in conjunction with an electronic actuator 74 to move the valve to its open position with valve face 52 away from valve seat 59 as shown in shadow. Actuator 74 would be controlled by the engine computer so that the timing of valve opening and closing events could be controlled independent of the engine's crankshaft position. During combustion events, over center device 73 is in its locked position and essentially functions as a solid push rod interconnecting valve member 51 to arm 69 of rocker arm 67. The other arm 68 of rocker arm 67 is connected to push rod 66 which is attached to end 62 of intensifier piston 63. Rocker arm 67 is capable of pivoting around pivot point 70. Thus, when over center device 73 is in its locked position, during a combustion event, the upward force acting on intensifier piston 63 is transferred to a downward force on valve member 51 via the mechanical coupling linkage provided by rocker arm 67. By adjusting the size of intensifier piston 63 and/or by varying the sizes of arms 68 and 69 of rocker arm 67, the force tending to hold outward valve member 51 closed is greater than the combustion pressure force tending to push the valve member open.

Industrial Applicability

By utilizing an intensifier piston that is coupled to the outward opening valve member via a coupling linkage as in the present invention, the valves' opening and closing mechanism can be separate from the means by which the valve is held closed during a combustion event. Thus, the present invention allows electronically controlled valve opening and closing mechanisms to be utilized in a manner in which the potential for direct piston to valve contact is eliminated while at the same time eliminating concerns about leakage past the valve during combustion events.

While the present invention could conceivably be utilized with an outwardly opening valve system that utilizes a mechanical cam driven device to open and close the valves, the present invention finds its preferred application in outwardly opening valve members that are actuated by electronic devices, such as solenoids or the like. The present invention allows engineers to explore various electronically actuated means for opening the valves in the continuing trend toward a camless engine without concern for possible failures due to mistaken electronic commands that might otherwise cause potentially catastrophic contact between the piston and valve member.

It should be understood that the above examples are for illustrative purposes only and are not intended to in any way limit the scope of the present invention. For instance, while the device has been illustrated as utilizing an over center/latch mechanism combined with an actuator as the means by which the valve is opened and closed, any other suitable opening and closing mechanism of a type known in the art could be utilized, whether it be mechanical or electronically actuated. In any event, the scope of the present invention should be determined solely in terms of the claims as set forth below.

I claim:

1. A method of holding a cylinder valve for an engine closed during combustion, comprising the steps of:

providing an engine with a hollow piston cylinder in fluid communication with a gas passageway via an opening, and having a piston bore that opens to said hollow piston cylinder;

including an outward valve seat in said opening adjacent said gas passageway;

providing an outward valve member with a valve face, and said valve member being movable between a closed position in which said valve face is against said valve seat closing said opening and an open position in which valve face is away from said valve seat;

positioning an intensifier piston in said piston bore so that one end contacts gas within said hollow piston cylinder; and coupling said intensifier piston to said outward valve member, *at least in part with an over center device,* such that a force on said intensifier piston from combustion pressure within said hollow piston cylinder is transformed into a force on said outward valve member that is opposite in direction and greater in magnitude to a force on said outward valve member from said combustion pressure within said hollow piston cylinder.

2. The method of claim 1 wherein said coupling step is accomplished by mechanically linking said intensifier piston to said [outward valve member] *over center device.*

3. The method of claim 1 wherein said coupling step is accomplished by hydraulically linking said intensifier piston to said [outward valve member] *over center device.*

4. An outwardly opening valve system for an engine, comprising:

an engine having a hollow piston cylinder in fluid communication with a gas passageway via an opening, and having a piston bore that opens to said hollow piston cylinder;

said opening including an outward valve seat adjacent said gas passageway;

an outward valve member with a valve face, and said valve member being movable between a closed position in which said valve face is against said valve seat closing said opening and an open position in which said valve face is away from said valve seat;

an intensifier piston positioned in said piston bore with one end contacting gas within said hollow piston cylinder; and a coupling linkage, *which includes an over center device,* interconnecting said intensifier piston and said outward valve member.

5. The outwardly opening valve system of claim 4 wherein said coupling linkage includes:

a first hydraulic plunger with one end attached to said outward valve member *via said over center device* and an other end contacting a hydraulic fluid in a fluid cavity; and a second hydraulic plunger with one end attached to said intensifier piston and an other end contacting said hydraulic fluid in said fluid cavity.

6. The outwardly opening valve system of claim 5 further comprising:

a re-supply passageway opening to said fluid cavity; and a check valve positioned in said re-supply passage and being operable to prevent back flow of said hydraulic fluid from said fluid cavity into said re-supply passage.

7. The outwardly opening valve system of claim 4 wherein said hollow piston cylinder is bounded by a surface; and said one end of said intensifier piston is about flush with said surface during combustion in said hollow piston cylinder.

8. The outwardly opening valve system of claim 4 wherein said coupling linkage includes a rocker arm pivotably mounted on said engine and having a first arm connected to said outward valve member and an other arm connected to said intensifier piston.

*9. The outwardly opening valve system of claim 4 wherein said over center device is movable between a locked position and an off center position.*

*10. The outwardly opening valve system of claim 4 wherein said coupling linkage includes a fluid cavity filled with an amount of a hydraulic fluid.*

*11. The outwardly opening valve system of claim 10 wherein said outward valve member is movable toward said open position without evacuating a portion of said hydraulic fluid from said fluid cavity.*

*12. An outwardly opening valve system including:*

*an engine having a hollow piston cylinder in fluid communication with a gas passageway via an opening, and having a piston bore that opens to said hollow piston cylinder;*

*said opening including an outward valve seat adjacent said gas passageway;*

*an outward valve member with a valve face, and said valve member being movable between a closed position in which said valve face is against said valve seat closing said opening and an open position in which said valve face is away from said valve seat;*

*an intensifier piston positioned in said piston bore with one end contacting gas within said hollow piston cylinder;*

*a coupling linkage interconnecting said intensifier piston and said outward valve member, which includes a fluid cavity filled with a hydraulic fluid; and*

*said outward valve member being movable toward said open position without evacuating a portion of said hydraulic fluid from said fluid cavity.*

*13. The outwardly opening valve system of claim 12 wherein said piston bore opens through a top of said hollow piston cylinder.*

*14. The outwardly opening valve system of claim 12 wherein said coupling linkage includes:*

*a first hydraulic plunger with one end operably connected to said outward valve member and an other end contacting said hydraulic fluid in said fluid cavity; and*

*a second hydraulic plunger with one end operably connected to said intensifier piston and an other end contacting said hydraulic fluid in said fluid cavity.*

*15. The outwardly opening valve system of claim 14 further including an over center device positioned between said first hydraulic plunger and said outward valve member.*

*16. The outwardly opening valve system of claim 15 wherein said piston bore opens through a top of said hollow piston cylinder.*

*17. An outwardly opening valve system including:*

*an engine having a hollow piston cylinder in fluid communication with a gas passageway via an opening, and having a piston bore that opens to said hollow piston cylinder;*

*said opening including an outward valve seat adjacent said gas passageway;*

*an outward valve member with a valve face, and said valve member being movable between a closed position in which said valve face is against said valve seat closing said opening and an open position in which said valve face is away from said valve seat;*

*an intensifier piston positioned in said piston bore with one end contacting gas within said hollow piston cylinder; and*

*a mechanical coupling linkage interconnecting said intensifier piston and said outward valve member.*

*18. The outward opening valve system of claim 17 means said mechanical coupling linkage includes a rocker arm.*

*19. The method of claim 3 wherein said hydraulically linking includes a fluid cavity filled with an amount of a hydraulic fluid; and the method further includes:*

*moving said outward valve member toward said open position without evacuating a portion of said hydraulic fluid from said fluid cavity.*

* * * * *

UNITED STATES PATENT AND TRADEMARK OFFICE
CERTIFICATE OF CORRECTION

PATENT NO. : Re. 36,499
DATED : 01/18/2000
INVENTOR(S) : Dennis D.Feucht

It is certified that error appears in the above-identified patent and that said Letters Patent is hereby corrected as shown below:

It is certified that error appears in the above-identified patent and that said Letter Patent is hereby corrected as shown below:

Column 8, line 11, delete "means" and insert "wherein" in claim 18.

Signed and Sealed this

Thirtieth Day of January, 2001

*Attest:*

Q. TODD DICKINSON

*Attesting Officer*

*Director of Patents and Trademarks*